United States Patent
Artman et al.

(10) Patent No.: US 8,341,433 B2
(45) Date of Patent: Dec. 25, 2012

(54) METHOD AND SYSTEM FOR MANAGING THE POWER CONSUMPTION OF AN INFORMATION HANDLING SYSTEM

(75) Inventors: Paul Artman, Austin, TX (US); Stuart Berke, Austin, TX (US)

(73) Assignee: Dell Products L.P., Round Rock, TX (US)

(*) Notice: Subject to any disclaimer, the term of this patent is extended or adjusted under 35 U.S.C. 154(b) by 708 days.

(21) Appl. No.: 11/969,268

(22) Filed: Jan. 4, 2008

(65) Prior Publication Data

US 2009/0177334 A1   Jul. 9, 2009

(51) Int. Cl.
*G06F 1/00* (2006.01)
*G05D 23/00* (2006.01)
*H05K 7/20* (2006.01)
*F24F 7/00* (2006.01)

(52) U.S. Cl. ........ 713/300; 700/276; 361/695; 236/49.3

(58) Field of Classification Search ............... 700/300, 700/276; 361/695; 236/49.3
See application file for complete search history.

(56) References Cited

U.S. PATENT DOCUMENTS

| | | | |
|---|---|---|---|
| 6,442,700 B1 | 8/2002 | Cooper | 713/320 |
| 6,487,668 B2 | 11/2002 | Thomas et al. | 713/322 |
| 6,535,798 B1 | 3/2003 | Bhatia et al. | 700/293 |
| 6,643,128 B2* | 11/2003 | Chu et al. | 361/679.48 |
| 6,889,332 B2 | 5/2005 | Helms et al. | 713/322 |
| 6,908,227 B2* | 6/2005 | Rusu et al. | 374/141 |
| 6,927,978 B2* | 8/2005 | Arai et al. | 361/695 |
| 6,977,812 B2* | 12/2005 | Sasaki | 361/679.48 |
| 7,106,590 B2* | 9/2006 | Chu et al. | 361/701 |
| 7,315,768 B2* | 1/2008 | Dang et al. | 700/276 |
| 7,661,003 B2* | 2/2010 | Naffziger et al. | 713/320 |
| 7,757,506 B2* | 7/2010 | Ellsworth et al. | 62/259.2 |
| 7,761,723 B2* | 7/2010 | Greiner et al. | 713/310 |
| 7,793,125 B2* | 9/2010 | Berry et al. | 713/320 |
| 2005/0023363 A1* | 2/2005 | Sharma et al. | 236/49.3 |
| 2005/0288886 A1* | 12/2005 | Therien et al. | 702/130 |
| 2006/0016901 A1* | 1/2006 | Beitelmal et al. | 236/49.3 |
| 2007/0213881 A1* | 9/2007 | Belady et al. | 700/300 |
| 2008/0148027 A1* | 6/2008 | Fenger et al. | 712/229 |
| 2009/0109230 A1* | 4/2009 | Miller et al. | 345/506 |
| 2009/0132844 A1* | 5/2009 | Allarey et al. | 713/340 |

OTHER PUBLICATIONS

Richard Chu et al, Reviw of Cooling Technologies for Computer Products, Dec. 2004, IEEE Transactions on Device and Materials Reliability.*
Intel, Intel Pentium 4 Processor on 90 nm Process Thermal and Mechanical Design Guidelines, Intel, Feb. 2004, pp. 25-38.*

* cited by examiner

*Primary Examiner* — Paul R Myers
*Assistant Examiner* — Christopher A Daley
(74) *Attorney, Agent, or Firm* — Baker Botts L.L.P.

(57) ABSTRACT

A method for managing the power consumption of an information handling system including a processor and an associated cooling system. The method may include providing power to the cooling system based on a performance/power balance setting, accepting a user input to adjust the performance/power balance setting, and adjusting the power provided to the cooling system based on the adjusted performance/power balance setting. The performance/power balance setting may define a balance between performance of the processor and power consumption of the associated cooling system.

20 Claims, 2 Drawing Sheets

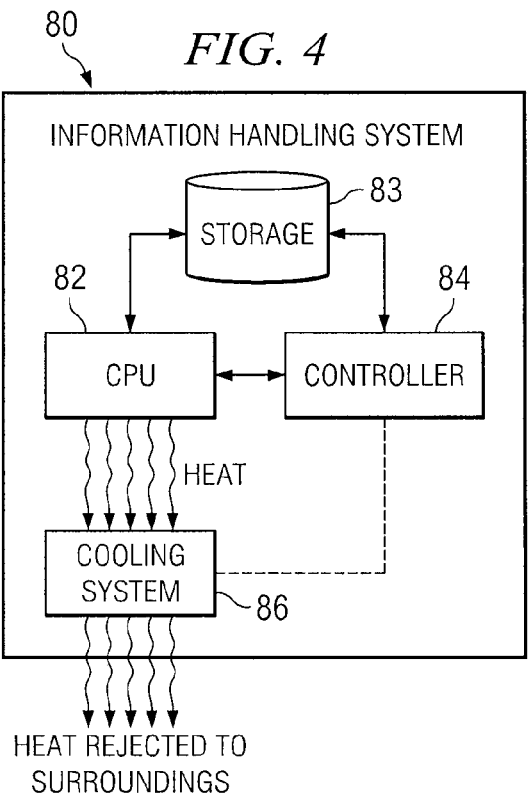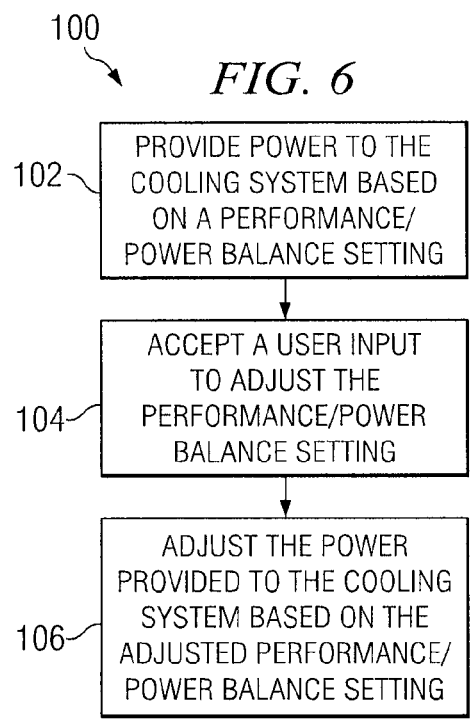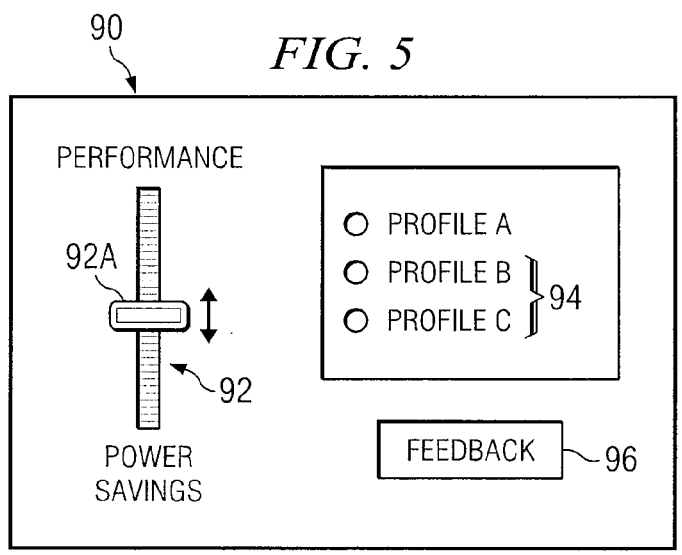

METHOD AND SYSTEM FOR MANAGING THE POWER CONSUMPTION OF AN INFORMATION HANDLING SYSTEM

TECHNICAL FIELD

The present invention is related to information handling systems and, more particularly, managing the power consumption of an information handling system.

BACKGROUND OF THE INVENTION

As the value and use of information continues to increase, individuals and businesses seek additional ways to process and store information. One option for processing and storing information is an information handling system. An information handling system generally processes, compiles, stores, and/or communicates information or data for business, personal, educational, governmental, or other purposes thereby allowing users to take advantage of the value of the information.

Because technology and information handling needs and requirements vary between different users and/or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is commonly referred to as a server or server system. As suggested by its name, a server system might be described as an information handling system that provides a service to one or more other information handling systems. Server systems include, as examples, application servers dedicated to running specified software applications, database servers that provide database services, file servers that provide file services, web servers that communicate with HTTP (Hypertext transfer protocol) clients to receive and respond to HTTP requests, and numerous other types of servers.

Another type of information handling system is commonly referred to as a personal computer, such as a laptop or desktop computer. FIG. 1 shows one example of a prior art information handling system 1 that may be referred to as a desktop computer. Information handling system 1 includes a host 10, a monitor 20, a keyboard 30, and a mouse 32. Information handling system 1 may include any components, devices, and/or peripherals configured to facilitate or support the operation of information handling system 1.

Host 10 may be a server, a laptop, and/or any other type of information handling system. Host 10 includes processing resources, e.g., one or more central processing units (CPUs) and storage resources that are accessible to the processing resources. Storage resources may include volatile storage or memory and/or persistent storage, e.g., disk storage, flash memory or other type of erasable read only memory (ROM), and the like. Host 10 may also include various other peripheral or I/O devices known in the field of data processing system design.

CPUs and/or other electronic components generate heat as a byproduct of operation. Electronics designers and users may find that using one or more cooling systems associated with an electronics component increases operating speeds and/or efficiency of the components so cooled. Some benefits of increased operating speeds may include, for example, an increase in how quickly and/or efficiently information may be processed, stored, and/or communicated.

FIG. 2 depicts a prior art cooling system 2 configured for use with a CPU or processor 40. Cooling system 2 includes a heat sink 50, a fan 60, and a controller 70. Cooling system 2 as shown is a common design used to facilitate heat transfer away from processor 40.

In the example shown, heat sink 50 includes a mass with a large heat capacity in comparison to that of processor 40. The large heat capacity facilitates rapid heat transfer from processor 40 into heat sink 50. Heat sink 50 also includes one or more fins 52. Fins 52 create a large surface area which increases the heat transfer from heat sink 50 to the surrounding air.

In addition, fan 60 is configured to increase the flow of air across heat sink 50 and fins 52. Increased flow of air, or some other coolant, results in increased heat convection away from heat sink 50 and fins 52. Persons having ordinary skill in the art will recognize that heat sink performance may be improved with a variety of methods, such as increasing the thermal conductivity of heat sink 50, increasing the surface area of heat sink 50 and/or fins 52, and/or by increasing the flow rate of the coolant across heat sink 50 and fins 52.

Controller 70 is a component or device configured to control the operation of fan 60 based on the actual temperature of processor 40. In the example shown, controller 70 receives a signal correlating to the temperature of processor 40 as measured by a temperature probe 42. Temperature probe 42 may be a thermocouple or another sensor configured to measure the temperature of processor 40 and communicate the measurement to controller 70.

Fan 60 includes a motor 62 configured to rotate fan 60. Controller 70 is configured to provide power to motor 62 (e.g., by controlling a power supply coupled to motor 62). Controller 70 may also be configured to control the speed of rotation of fan 60. In this example, controller 70 may increase the speed of fan 60 in response to an increased temperature measurement provided by temperature probe 42. Increasing the speed of fan 60 increases the flow rate of air forced across heat sink 50 and fins 52. In this manner, controller 70 is configured to increase the heat transfer away from processor 40 if the temperature of processor 40 increases.

Typically, processor temperatures are controlled with respect to a specified thermal profile promulgated by the designer of the processor. A thermal profile defines the operating thermal limits of a processor. The purpose of a thermal profile is to ensure optimal operating conditions as well as the long-term reliability of a processor. For example, INTEL propounds up to two different thermal specifications for its processors, including one profile identified as minimizing the chances of processor throttling and one allowing an increased chance of processor throttling in exchange for decreased cooling requirements. Both specifications meet the requirements to support Intel reliability requirements. Typical information handling systems are configured during fabrication to operate their processors within temperatures defined by these or similar thermal profiles.

"Processor throttling" refers to a phenomenon sometimes observed when processors operate at increased temperature. Specifically, transistor performance may be slowed at certain raised temperatures because the speed of switch operation is reduced. In addition, prolonged exposure to increased temperature may result in an increased failure rate. Many information handling systems include governors configured to measure throttling effects based on feedback from the processors. The thermal profiles discussed above may include an upper temperature limit calculated to reduce and/or eliminate the chance that a processor will suffer processor throttling.

FIG. 3 is a graphical representation of two thermal profiles related to processors such as processor 40 described in relation to FIG. 2. FIG. 3 is a graph of the temperature at the center of a processor ($T_{CASE}$) versus the power dissipation requirement (Power). The power dissipation requirement defines the amount of power that must be removed from a processor to operate within a given thermal profile. Along the y-axis ($T_{CASE}$), FIG. 3 depicts a dotted line labeled $T_{control}$. As long as $T_{CASE}$ remains at or below $T_{control}$, the required power dissipation from the processor is not specified with respect to a thermal profile. When $T_{CASE}$ exceeds $T_{control}$, processor 40 is operating within a thermal profile regime.

Line A represents a high-reliability temperature profile (Profile A) in which the required power dissipation increases rapidly as $T_{CASE}$ increases. Line B represents a more aggressive thermal profile (Profile B), in which $T_{CASE}$ is allowed to increase more dramatically than the profile represented by Line A. As shown on the y-axis ($T_{CASE}$), the maximum temperature allowed under Profile A is lower than the maximum temperature allowed under Profile B. Under either profile, the thermal design power (TDP) is a target maximum power dissipation value or requirement for processor 40. Current information handling systems are designed to control any cooling systems, and therefore processor temperature, based on a thermal profile selected at the time the information handling system is fabricated.

In exchange for reliability and/or high performance, operation of a cooling system presents its own costs in power consumption, noise, manufacturing complexity, failure modes and/or additional negative consequences. Designers, manufacturers, purchasers and users of information handling systems, CPUs, integrated circuits, microprocessors, and/or any other electronics components may be well served by techniques and apparatus that provide increased performance without the typically attendant negative consequences. Under the current regime, restricting the processor temperature to $T_{CASE,Max}$ instead of a true temperature maximum may reduce the power consumption and cost resulting from a cooling system, but sacrifices some potential performance increase.

Power consumption has become an increasingly important aspect or feature of a server system and other information handling system platforms. In any information handling system, cooling systems consume power. It is anticipated that this power consumption will increase as the speed and efficiency of electronics components increases. While the purchase price and installation cost of a system including a cooling system may be a one time financial impact, the total cost of ownership may be greatly affected by the ongoing cost of energy consumed by the system. Any system or method for reducing the power consumption of cooling systems may offer an improvement in the overall performance of information handling systems.

SUMMARY OF THE INVENTION

The present disclosure describes a system and method for managing the power consumption of an information handling system including a processor and an associated cooling system. Although the following discussion focuses on processors and cooling systems in the context of servers and server systems, these teachings may be used in a variety of applications related to power management in any other type of information handling system or electronic system.

In one embodiment, the present disclosure provides a method for managing the power consumption of an information handling system including a processor and an associated cooling system. The method may include providing power to the cooling system based on a performance/power balance setting, accepting a user input to adjust the performance/power balance setting, and adjusting the power provided to the cooling system based on the adjusted performance/power balance setting. The performance/power balance setting may define a balance between performance of the processor and power consumption of the associated cooling system.

In another embodiment, the present disclosure provides an information handling system including a processor, a cooling system, and a controller. The cooling system may associated with the processor and may be configured to provide a flow of cooling fluid across the heat sink. The controller may be configured to manage operation and power consumption of the cooling system in response to a user input. User input may include selecting a performance/power balance setting defining a balance between the performance of the processor and the power consumption of the cooling system.

In another embodiment, the present disclosure provides a computer program product comprising computer executable instructions, stored on a computer readable medium, for managing the power consumption of an information handling system including a processor and an associated cooling system. The computer executable instructions may include instructions for providing power to the cooling system based on a performance/power balance setting, instructions for accepting a user input to adjust the performance/power balance setting, and instructions for adjusting the power provided to the cooling system based on the adjusted performance/power balance setting. The performance/power balance setting may define a balance between performance of the processor and power consumption of the associated cooling system.

Embodiments of the present disclosure may include a various technical advantages. One technical advantage of certain embodiments is the ability to reduce power consumption in cooling systems associated with information handling systems. Additional advantages may be apparent to those of skill in the art and from the figures, description and claims provided herein.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein:

FIG. 4 depicts one embodiment of an information handling system including a CPU, a storage device, a controller, and a cooling system incorporating teachings of the present disclosure;

FIG. 5 depicts selected elements of a display 90 that may allow a user to select a performance/power balance setting in accordance with teachings of the present disclosure; and FIG. 6 depicts a flow diagram illustrating a method for managing the power consumption of an information handling system including a processor and an associated cooling system, according to certain embodiments of the present disclosure.

DETAILED DESCRIPTION OF THE INVENTION

Figure 1:
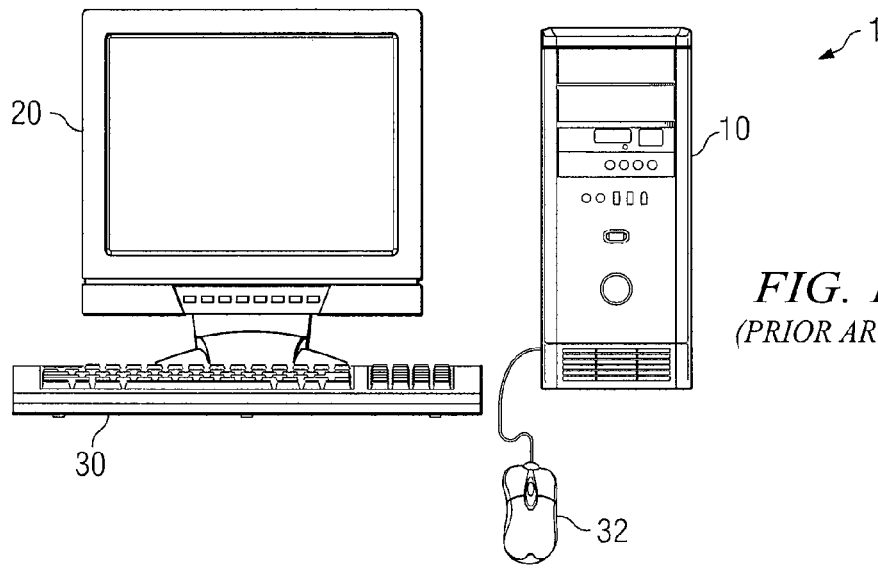
FIG. 1 depicts one example of a prior art information handling system that is commonly known as a desktop computer.
Figure 2:
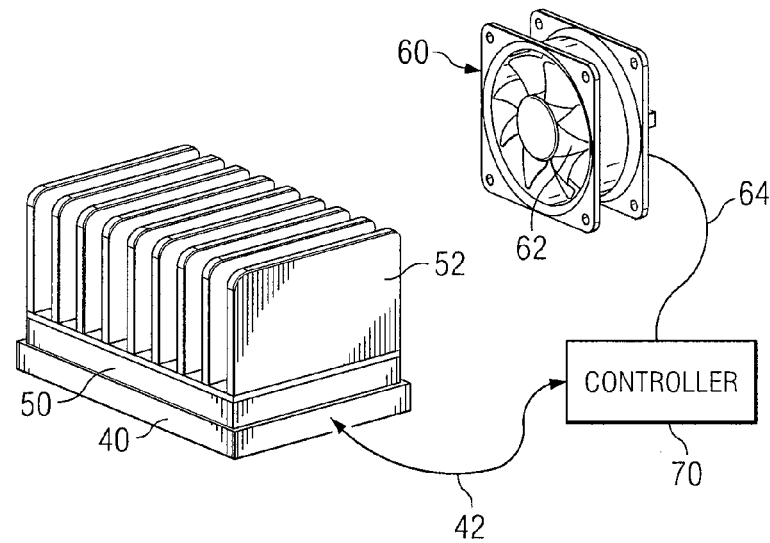
FIG. 2 depicts one example of a prior art cooling system configured for use with a CPU.
Figure 3:
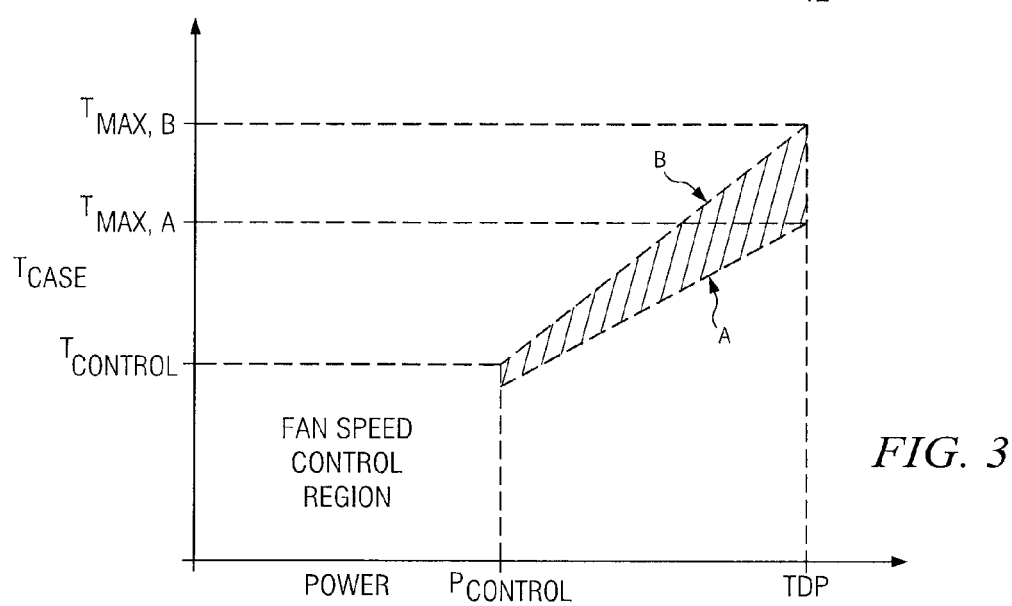
FIG. 3 is a graphical representation of two thermal profiles related to processors such as the processor described in relation to FIG. 2.

Preferred embodiments of the invention and its advantages are best understood by reference to FIGS. 4 and 5 wherein like numbers refer to like and corresponding parts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For the purposes of this disclosure, computer-readable media may include any instrumentality, or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

The exemplary implementations of system management resources presented herein may emphasize system management resources in the context of server systems; it should be understood, however, that the system management features described herein may also be appropriate for other types of information handling systems including, as examples, desktop systems, mobile systems including notebook or lap top systems, and hand held systems.

FIG. 4 depicts one embodiment of an information handling system 80 including a CPU, a storage device, a controller, and a cooling system incorporating teachings of the present disclosure. Information handling system 80 may include a server, a laptop, a PDA, a cell phone, and/or any information handling system. Information handling system 80 may include processing resources (e.g., one or more central processing units (CPUs) 82) and storage resources 83 that are accessible to the processing resources, as well as a cooling system 86 configured to remove heat from CPU 82.

Storage resources 83 may include volatile storage or memory and/or persistent storage, e.g., disk storage, flash memory or other type of erasable read only memory (ROM), and the like. Information handling system 80 may also include various other peripheral or I/O devices known in the field of information handling system design.

In addition, information handling system 80 may include a device, element and/or programming operating as a controller 84 and associated with CPU 82. Controller 84 may include any element, device, and/or programming operable to interface with CPU 82 and facilitate operation of information handling system 80. For example, controller 84 may include an operating system (OS), a system management controller (SMS), software, firmware, a hypervisor, a boot monitor, a baseboard management controller (BMC), a remote access card (RAC), an integrated memory controller (IMC), and/or a console management controller (CMC). In some embodiments, controller 84 may include a stand-alone processor operable to monitor the resources of information handling system 80 in communication with other resources of information handling system 80 (e.g., BIOS and/or a boot monitor).

Cooling-system 86 may include any device, component, and/or feature configured to remove heat from CPU 82 and transfer the heat to the surroundings of information handling system 80. For example, cooling system 86 may include a heat sink associated with CPU 82 and a fan configured to provide a flow of air across the heat sink. In another embodiment, cooling system 86 may comprise a closed-loop liquid cooling system including, for example, an impingement cooler associated with CPU 82, a system of tubing to channel a liquid to the impingement cooler, a heat exchanger to transfer heat from the liquid to another medium, and a pump to circulate the liquid coolant around the closed-loop. Such a closed-loop liquid cooling system may also include a fan configured to provide a flow of air across the heat exchanger. Persons having ordinary skill in the art will be able to identify various alternatives and equivalents to these components of cooling system 86.

Controller 84 may be configured to manage the operation of cooling system 86. For example, information handling system 80 may include sensors or devices operable to communicate the temperature of CPU 82 to controller 84. Controller 84 may be configured to increase the operation of cooling system 86 in response to increases in the temperature of CPU 82, including increasing fan speed, pump speed, and/or any other operating parameter of cooling system 86.

In operation, the elements of information handling system 80 depicted in FIG. 4 may cooperate to manage the power consumption of information handling system 80 and/or cooling system 86. For example, information handling system 80 may provide power to cooling system 86 based on a performance/power balance setting chosen by a user. As another example, information handling system 80 may accept a user input to adjust the performance/power balance setting and automatically adjust the power provided to cooling system 86 based on the adjusted performance/power balance setting.

FIG. 5 depicts selected elements of a display 90 that may allow a user to select a performance/power balance setting in accordance with teachings of the present disclosure. Display 90 may include a slider 92, a menu 94, and a feedback panel 96. Additional embodiments of information handling system 80 may include other elements and may or may not include a display (e.g., display 96). For example, information handling system 80 may include switches, knobs, dials, buttons, and/or other mechanical devices or components configured to allow a user to select a performance/power balance setting.

Information handling system 80 may include any of several options for operation of cooling system 86. For example, controller 84 may monitor the temperature of CPU 82 and increase the power to cooling system 86 to comply with a thermal profile promulgated by the manufacturer or designer of CPU 82. Information handling system 80 may store data related to two or more thermal profiles in storage 83. Controller 84 may access the two or more thermal profiles stored in storage 83 and manage the operation of cooling system 86.

In some embodiments of information handling system 80, the operation of cooling system 86 may include a trade-off between reliability of the processor and cost of operation, or between peak performance of the processor and cost of operation. For example, a user may select a profile guaranteeing maximum processor reliability and performance and elect to incur the costs of operating the cooling system aggressively. As another example, a user may select a minimum power consumption profile and elect to risk processor throttling.

In other embodiments, a user may adjust the performance/power balance setting to account for changing workloads over time, for short spans of performance demands, and/or for any other reason. Offering a user option to adjust the performance/power balance setting allows the user to manage the power consumption of information handling system 80.

A user may configure controller 84 to operate according to a specific thermal profile by changing the performance/power balance setting in software, firmware, and/or any other component associated with information handling system 80. In one embodiment, a user may select a performance/power balance setting that has been stored in BIOS or some other component of information handling system 80.

In some embodiments, information handling system 80 may allow a user to set (e.g., via a graphical user interface (GUI)) a performance/power balance setting defining a balance between the performance or reliability of CPU 82 and the power consumption of cooling system 86. For example, information handling system 80 may provide a slider 92A on scale 92 shown on display 90. A user may move slider 92A along scale 92 to indicate a preference for performance or for power savings. Controller 84 may interpret the setting of slider 92A to select among two or more thermal profiles.

As another example, information handling system 80 may provide a user option to select among two or more thermal profiles or protocols. For example, information handling system 80 may allow a user to select 'maximum performance' or 'minimum power consumption'. In embodiments including a user option to select among two or more thermal profiles or protocols, information handling system 80 may show menu 94 on display 90. Menu 94 may include a list of available thermal profiles (e.g., Profile A, Profile B, Profile C). Menu 94 may include check boxes that a user may select to indicate a selection of thermal profiles. For example, menu 94 may include a list of processor thermal profiles promulgated by the processor designer, a list of processor thermal profiles created by the designer of information handling system 80, and/or a list of names indicative of the characteristics of any thermal profiles (e.g., "High Performance", "Power Saving", "Balanced", etc.).

In some embodiments, controller 84 may manage the operation of cooling system 86 to comply with energy conservation standards, experimental results, and/or any other protocol. In such embodiments, information handling system 80 may provide display 90 offering scale 92 and/or menu 94 with any metrics or selection criteria appropriate for the operation of controller 84 and/or the operation of cooling system 86.

Reducing the power provided to cooling system 86 may reduce the power consumption of information handling system 80. In addition, reducing the power provided to cooling system 86 may reduce the noise produced by the operation of cooling system 86. For example, in a 10G blade server system with a 16-blade configuration, changing from a high reliability thermal profile to a power saving profile may result in a power saving of 175 watts in a typical data center environment (e.g., 25 Celsius).

As shown in FIG. 5, information handling system 80 may provide feedback panel 96 on display 90. Feedback panel 96 may include any device, component, and/or element of display 90 configured to display data to a user. For example, feedback panel 96 may include a light, a dial, a digital readout, a bar graph, a line graph, and/or any other visual system for displaying information. Feedback panel 96 may be configured to display the results of the user's selection for performance/power balance setting (e.g., feedback panel may illustrate the performance of information handling system 80, CPU 82, and/or cooling system 86).

For example, feedback panel 96 may include a graph of power consumed by cooling system 86. As another example, feedback panel 96 may include a digital readout showing the comparison of power saved between two or more profiles (e.g., "Profile A" and "Profile B"). As another example, feedback panel 96 may include a recommendation for selection of a thermal profile based on the historical operation of information handling system 80, CPU 82, and/or cooling system 86.

It should be emphasized that the implementation of information handling system 80 as described above is merely exemplary, particularly with regard to the description of specific types of management controllers and specific types of interfaces and protocols. Other management controllers, interfaces, and protocols may be used in lieu of those described herein. For example, an NC-SI interface may be used. NC-SI is an emerging DTMF standard for a NIC-sideband interface suitable for MII or reduced MII implementations. In addition, teachings of the present disclosure may be applied to manage the power consumption of additional electronics components or processors (e.g., graphics processors, LEDs, chipsets, etc.).

FIG. 6 depicts a flowchart illustrating one embodiment of a method 100 for managing the power consumption of information handling system 80 in accordance with the teachings of the present disclosure. In the depicted embodiment, information handling system 80 may include a processor 82 and an associated cooling system 86 configured to remove heat from processor 82.

At Step 102, information handling system 80 may provide power to cooling system 86 based on a performance/power balance setting. In some embodiments, Step 102 may be performed by controller 84. The performance/power balance setting may be set in any appropriate manner (e.g., set in BIOS of information handling system 80, selected by a user while information handling system in is operation, and/or any other manner of selecting a performance/power balance setting).

At Step 104, information handling system 80 may accept a user input to adjust the performance/power balance setting. The user input may be accepted via a GUI and received by controller 84, or accepted in any other manner by information handling system 80. As examples, information handling system 80 may offer display 90 as discussed in relation to FIG. 5 (e.g., a slider and/or a menu).

At Step 106, information handling system 80 may automatically adjust the power provided to cooling system 86 based on the adjusted performance/power balance setting.

In some embodiments, method 100 may include additional steps (e.g., providing user feedback, monitoring the performance and/or temperature of processor 82, recommending a selection of performance/power balance setting, etc.).

Although the disclosed embodiments have been described in detail, it should be understood that various changes, substitutions and alterations can be made to the embodiments without departing from their spirit and scope.

What is claimed is:

1. A method for managing the power consumption of an information handling system including a processor and an associated cooling system, the method comprising:
    defining at least two performance/power balance settings, each performance/power balance setting correlating to a performance state for the processor and a power state for the cooling system, and each performance/power balance setting corresponding to a respective pre-defined thermal profile for the processor;
    providing power to the cooling system based on both a sensed temperature associated with the processor and a first performance/power balance setting;
    accepting a user input to select a different performance/power balance setting; and
    adjusting the power provided to the cooling system based on both the sensed temperature associated with the processor and the different performance/power balance setting.

2. The method of claim 1, further comprising recommending to the user a selection for the performance/power balance setting based on the historical performance of the information handling system.

3. The method of claim 1, wherein the at least two performance/power balance settings includes at least two processor thermal profiles associated with the processor.

4. The method of claim 1, wherein accepting a user input includes accepting a user change to one or more settings of a boot monitor associated with the information handling system.

5. The method of claim 1, wherein accepting a user input includes accepting a user change to one or more settings of an operating system associated with the information handling system.

6. The method of claim 1, wherein providing power to the cooling system is performed by a baseboard management controller.

7. The method of claim 1, wherein providing power to the cooling system is performed by an operating system associated with the information handling system.

8. The method of claim 1, wherein providing power to the cooling system is performed by firmware associated with the information handling system.

9. The method of claim 1, wherein providing power to the cooling system is performed by a system management controller.

10. The method of claim 1, wherein adjusting the power provided to the cooling system includes varying performance/power balance setting based on an anticipated workload of the information handling system.

11. The method of claim 1, wherein adjusting the power provided to the cooling system includes varying performance/power balance setting based on a measured workload of the information handling system.

12. An information handling system comprising:
    a processor;
    a cooling system associated with the processor, the cooling system configured to enhance heat transfer from the processor; and
    a controller configured to manage the operation and power consumption of the cooling system based on at least two performance/power balance settings, each performance/power balance setting correlating to a performance state for the processor and a power state for the cooling system, and each performance/power balance setting corresponding to a respective pre-defined thermal profile for the processor;
    the controller further configured to accept a user input;
    wherein the user input comprises selecting one of the at least two performance/power balance settings.

13. The information handling system of claim 12, wherein the controller comprises a baseboard management controller.

14. The information handling system of claim 12, wherein the controller comprises a boot monitor.

15. The information handling system of claim 12, wherein the user input comprises selecting among thermal profiles associated with the processor.

16. The information handling system of claim 12, wherein the cooling system includes:
    a heat sink associated with the processor; and
    a fan configured to provide a flow of cooling gas across the heat sink.

17. A computer program product comprising computer executable instructions, stored on a tangible computer readable medium, for managing the power consumption of an information handling system including a processor and an associated cooling system, the instructions comprising:
    instructions defining at least two performance/power balance settings, each performance/power balance setting correlating to a performance state for the processor and a power state for the cooling system, and each performance/power balance setting corresponding to a respective pre-defined thermal profile for the processor;
    instructions for providing power to the cooling system based on one of the at least two performance/power balance settings;
    instructions for accepting a user input to select a different performance/power balance setting; and
    instructions for adjusting the power provided to the cooling system based on the different performance/power balance setting.

18. The computer program product of claim 17, further comprising:
    instructions for recommending to the user a selection for the performance/power balance setting based on a historical performance of the information handling system.

19. The computer program product of claim 17, wherein the instructions for accepting the user input to adjust the performance/power balance setting includes instructions for accepting a user selection of one or more processor thermal profiles associated with the processor.

20. The computer program product of claim 17, wherein the instructions for adjusting the power provided to the cooling system include instructions for varying the performance/power balance setting based on the anticipated workload of the information handling system.

* * * * *